Jan. 4, 1927. 1,613,272
H. GOSSE, SR
ADJUSTABLE SAFETY DEVICE FOR SEEDERS AND THE LIKE
Filed Jan. 18, 1926

INVENTOR.
Henrey Gosse Sr
BY David E. Carlsen.
ATTORNEY.

Patented Jan. 4, 1927.

1,613,272

UNITED STATES PATENT OFFICE.

HENREY GOSSE, SR., OF WABASHA, MINNESOTA.

ADJUSTABLE SAFETY DEVICE FOR SEEDERS AND THE LIKE.

Application filed January 18, 1926. Serial No. 82,010.

My invention relates to seeding machines commonly known simply as seeders with cultivator blades or points and the object is to provide a simple, inexpensive and efficient construction for adjusting all the cultivator points simultaneously to a desired angle. The construction further involves certain features whereby broken or bent standards may readily be replaced or readjusted as the case may be.

Figure 2:
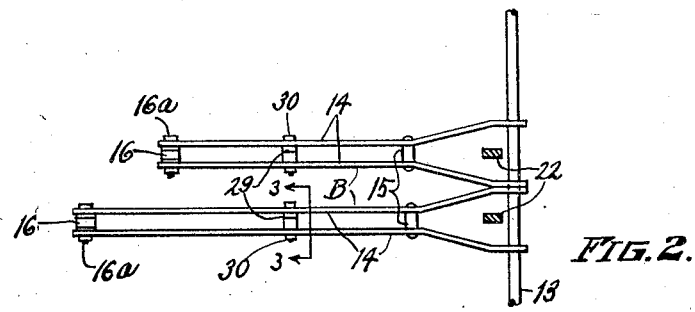
Fig. 2 is a sectional view of one pair of drag bars about on line 2—2 in Fig. 1.

Referring to the drawing by reference numerals 5 designates the usual quadrangular main frame of a seeder on which is mounted any suitable type of seed hopper 6, the frame being supported by the main axle 7 and ground wheels 8. 9 is the driver's seat and 10 the usual draft tongue. 11 are any suitable kind of brackets fixed as at 12, one at each side of the main frame and in the lower part of which is journaled a transverse shaft 13. The latter shaft is pivotally engaged by the forked forward ends of a series of longitudinally and rearwardly extending drag-bars B. Said drag bars comprise preferably each two spaced steel bars 14 held in parallel relation by suitable spacers 15 and between the rear ends of each of said pair of bars is pivotally suspended as at 16ª a standard 16 the lower end of which is bent forwardly and adapted to carry the usual cultivating member or point 17.

It is well known in agricultural practice that the points 17 sometimes contact with hard unyielding objects causing the standard 16 to bend or break and also causing considerable strain on other parts.

I prefer to make the rear ends of the drag bars directed upwardly so that each pivot 16ª is above the main body of the bar. 18 is a rod arranged longitudinally below and parallel to each drag B, its rear end having a suitable clevis 19 the bore of which may be aligned with a hole in each standard 16 into which is placed a break-pin 20. The forward end of each rod 18 is preferably threaded for a detachable clevis 21 between the jaws of which is pivotally secured as at 22ª the lower end of a rocker arm 22 oscillatable longitudinally of the drag bar. Said arm 22 is suitably fixed removably on a square shaft 23 arranged parallel to and above shaft 13 and its ends journaled in the brackets 11. It will be readily understood that each lever 22 is oscillatable freely between the forked or spread members 14 of the drag bar and adjacent shaft 13. All the arms 22 are oscillated simultaneously by a lever 24 fulcrumed on shaft 23 and the free end of said lever 24 connected as with a bar 25 to any suitable type of hand operated lever as 26 pivoted as at 27 in frame 5. The lever 26 may have a latch 27 engageable with a fixed ratchet 28. Thus the lever 26 through bar 25, lever 24, arm 22 and rod 18, enables the operator to set all the standards 16 and points 17 simultaneously at any desired angle. It is further readily seen that if any point 17 meets a solid object while the seeder is in motion the break pin 20 will shear but is readily accessible for removal and replacement.

Figure 1:
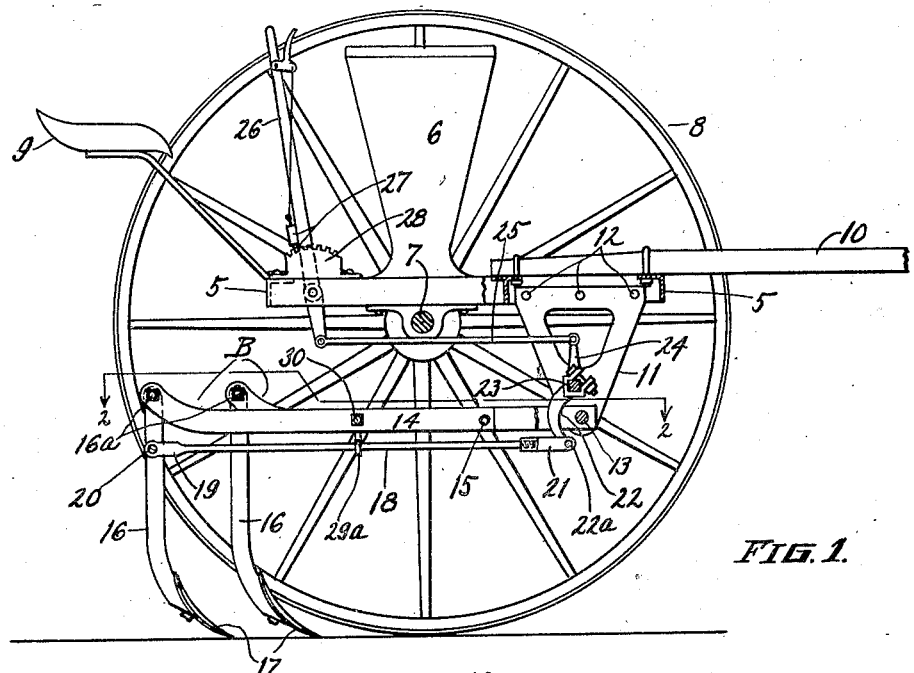
Fig. 1 is a partly sectional side elevation of a seeder of which the right hand ground wheel is omitted and showing my device in operative position.
Figure 3:
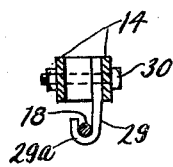
Fig. 3 is an enlarged sectional view as on line 3—3 in Fig. 2.

29 is a preferred type of hanger and guide arm for each bar 18 and comprises a depending arm the upper end of which is suitably secured between the bars 14 by a bolt 30 and the lower part comprises an upwardly opening hook 29ª. It is thus clear that when assembling the device each rod 18 is dropped into resting position (see Fig. 3) in hook 29ª; also it is clear that all the standards 16 may be properly aligned by adjusting the threaded clevis 21 before the latter is pivotally connected as at 22ª to its arm 22. It may be found more convenient to reverse the position of rods 18 from that shown in Fig. 1, that is, to have the threaded clevis at the rear.

The use of my device has already been fully disclosed.

What I claim is:

In an agricultural implement of the class described having a transverse shaft, drag bars pivotally mounted on said shaft and extending from said shaft in parallel and vertically oscillatable relation, a standard pivotally suspended from the free end of each drag bar and having a cultivator element fixed to its lower end; a rod slidably arranged in parallel relation to each drag bar, a transverse rock shaft oscillatably mounted parallel to the first mentioned shaft, lever arms removably secured on said rock shaft, each of said rods pivotally connected with one end to one of said arms and its other end pivotally connected to the standard depending from its adjacent drag bar and means for oscillating and holding said rock shaft as desired, said drag bars each provided with depending hanger and guide members for its rod, said members comprising an upwardly opening hook in which the rod is slidably supported and guided.

In testimony whereof I affix my signature.

HENREY GOSSE, Sr.